United States Patent [19]

Cheng

[11] Patent Number: 5,351,984
[45] Date of Patent: Oct. 4, 1994

[54] TROLLEY WITH IMPROVED TELESCOPIC HANDLES

[76] Inventor: Chiun J. Cheng, No. 20, Lane 327, Sec. 2, Chung Shan Rd., Chung Ho City, Taipei Hsien, Taiwan

[21] Appl. No.: 148,852

[22] Filed: Nov. 8, 1993

[51] Int. Cl.$^5$ ............................................. B62B 1/12
[52] U.S. Cl. ............................. 280/655; 280/47.18; 280/47.315
[58] Field of Search ............... 280/638, 639, 651, 652, 280/655.1, 655, 659, 654, 47.17, 47.18, 47.24, 47.26, 47.27, 47.29, 47.19, 47.131, 47.315, 37

[56] References Cited

U.S. PATENT DOCUMENTS

| | | | |
|---|---|---|---|
| 4,896,897 | 1/1990 | Wilhelm | 280/47.2 X |
| 4,974,871 | 12/1990 | Mao | 280/655 X |
| 5,024,458 | 6/1991 | Kazmark et al. | 280/655 X |
| 5,127,664 | 7/1992 | Cheng | 280/655 |
| 5,178,404 | 1/1993 | Chen | 280/655 |
| 5,257,800 | 11/1993 | Yang | 280/655 X |
| 5,263,727 | 11/1993 | Libit et al. | 280/655 X |

Primary Examiner—Karin L. Tyson
Assistant Examiner—Carla Mattix
Attorney, Agent, or Firm—William E. Pelton

[57] ABSTRACT

A trolley with two telescopic handles each including a first tube received in a second tube received in a third tube. The first tube has first and second holes formed therethrough. The second tube has first, second and third holes formed therethrough. The third tube has a hole formed therethrough. A first locking device is mounted on the second tube so that a latch thereof is insertable through the first hole formed through the second tube. The latch of the first locking device is further insertable through the first and second holes formed through the first tube to lock the first tube in different positions in the second tube. A second locking device is mounted on the third tube so that a latch thereof is insertable through the hole formed through the third tube. The latch of the second locking device is further insertable through the second and third holes to lock the second tube in different positions in the third tube. The handle is locked in a retracted position as the latch of the second locking device is inserted through the second hole formed through the second tube and the second hole formed through the first tube. An actuating pole with four blocks formed thereon is received in the handle to retract the latches into the first and second holes formed through the first tube so that the first tube is movable relative to the second tube and to retract the latches into the second and third holes formed through the second tube so that the second tube is movable relative to the third tube.

3 Claims, 6 Drawing Sheets

TROLLEY WITH IMPROVED TELESCOPIC HANDLES

BACKGROUND OF INVENTION

The present invention relates to a trolley for carrying luggage or the like and, particularly, to a trolley with two telescopic handles being lockable in a retracted position.

There have been various trolleys for carrying luggage or the like. U.S. Pat. No. 5,127,664 issued to the present inventor on 7 July 1992 is believed to be most pertinent to the present invention. U.S. Pat. No. 5,127,664 teaches a trolley employing two telescopic handles each employing a device for locking the telescopic handle in an extended position. It is easy to maintain the locking device. However, such a locking device fails to lock the telescopic handle in a retracted position. Therefore, this invention is intended to mitigate and/or obviate the above-mentioned drawback in the manner as set forth in detailed description of the preferred embodiment.

SUMMARY OF THE INVENTION

It is an object of the present invention to provide a telescopic handle being lockable in a retracted position.

It is another object of this invention to provide a telescopic handle being lockable in any desired position.

These and other objects are achieved by providing two telescopic handles each including a first tube received in a second tube received in a third tube. The first tube has first and second holes formed therethrough. The second tube has first, second and third holes formed therethrough. The third tube has a hole formed therethrough. A first locking device is mounted on the second tube so that a latch thereof is insertable through the first hole formed through the second tube. The latch of the first locking device is further insertable through the first and second holes formed through the first tube to lock the first tube in different positions in the second tube. A second locking device is mounted on the third tube so that a latch thereof is insertable through the hole formed through the third tube. The latch of the second locking device is further insertable through the second and third holes to lock the second tube in different positions in the third tube. The handle is locked in a retracted position as the latch of the second locking device is inserted through the second hole formed through the second tube and the second hole formed through the first tube. An actuating pole with four blocks formed thereon is received in the handle to retract the latches into the first and second holes formed through the first tube so that the first tube is movable relative to the second tube and to retract the latches into the second and third holes formed through the second tube so that the second tube is movable relative to the third tube.

Other objects, advantages, and novel features of the invention will become more apparent from the following detailed description when taken in conjunction with the accompanying drawings.

DETAILED DESCRIPTION OF THE PREFERRED EMBODIMENTS

Before the present invention is described, reference is made to U.S. Pat. No. 5,127,664 which is incorporated in the present application.

Figure 1:
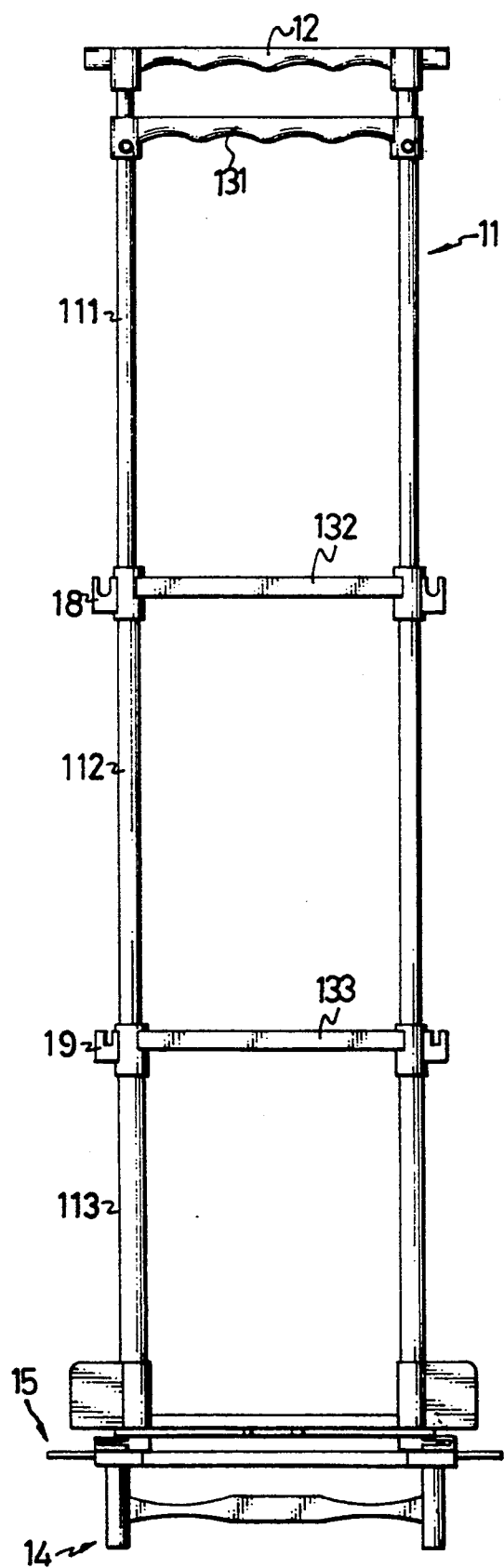
FIG. 1 is a front view of a trolley employing two telescopic handles in accordance with the present invention.

Referring to FIG. 1, in accordance with the present invention, a trolley employs two telescopic handles 11, a handle bar 12, an actuating lever 131, two connectors 132 and 133, a wheel means 14 and a support means 15. The wheel means 14 is mounted on the support means 15.

Each telescopic handle 11 has a number of tubes in accordance with the present invention. However, details are given to a handle 11 with a tube 111 being telescopically received in a tube 112 being telescopically received in a tube 113 being attached to the support means 15.

The first tubes 111 are linked to each other by means of the handle bar 12. The actuating lever 131 is mounted between the first tubes 111. The second tubes 112 are linked to each other by means of a connector 132. The third tubes 113 are linked to each other by means of a connector 133. Two locking devices 18 are formed at two ends of the connector 132. Two locking devices 19 are formed at two ends of the connector 133.

Details of the above-mentioned elements have been given in U.S. Pat. No. 5,127,664, therefore, they will not be described in detail.

Figure 2:
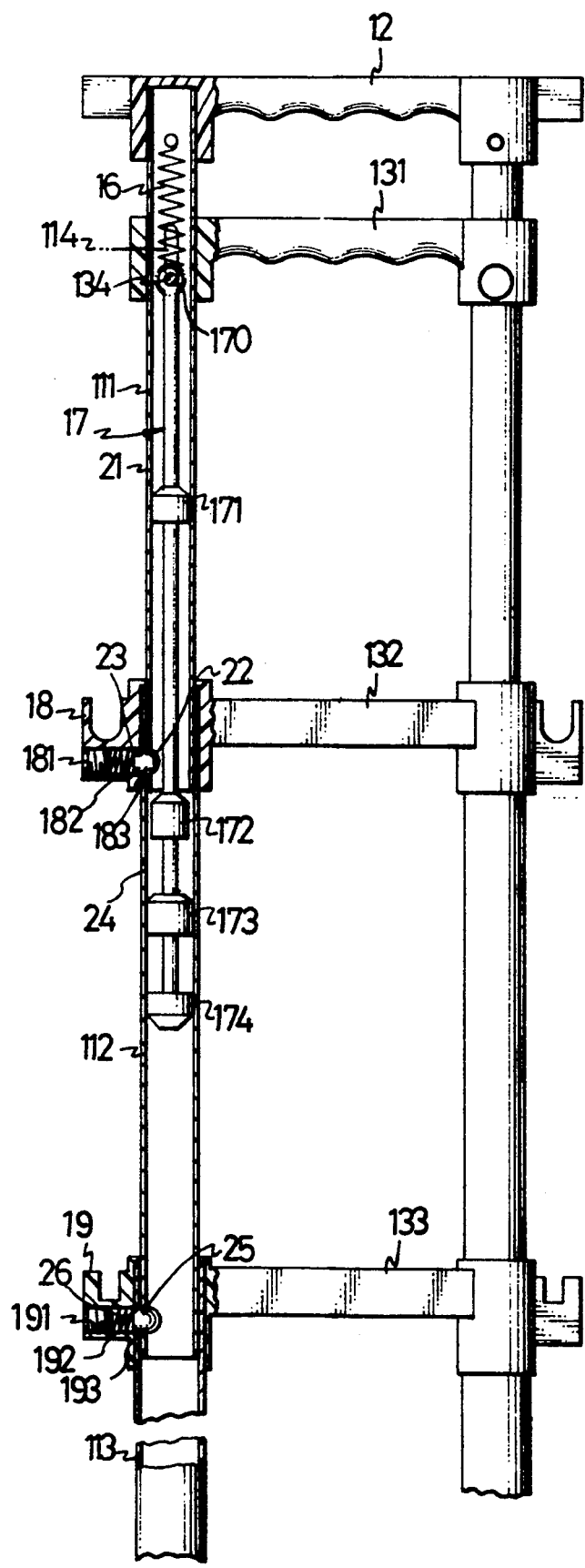
FIG. 2 is an enlarged partial view of two telescopic handles locked in an extended position in accordance with the present invention, showing one of the telescopic handles in a cross-sectional view for illustrating a plurality of components received therein.

Referring to FIG. 2, details are given to the telescopic handle 11 shown in a cross-sectional view for the convenience of description.

Two caps are each formed near each end of the handle bar 12. Each cap has two opposite holes formed therein. The tube 111 has two opposite pin-receiving holes formed in an upper end thereof. A pin is inserted through the holes formed through one cap of the handle bar 12 and is further inserted through the pin-receiving holes formed through the tube 111 so that the tube 111 is firmly attached to the handle bar 12.

The tube 111 further has two opposite slots 114 formed therethrough so that the central length of each slot 114 is parallel to the axis of the tube 111. Two sleeves are formed at two ends of the actuating lever 131. Two opposite holes are formed through each sleeve formed on the actuating lever 131. A pin 134 is inserted through two holes formed through a corresponding sleeve formed on the actuating lever 131 and is further inserted though the slots 114 formed in the tube 111 and is further inserted through an eye 170 formed at an upper end of an actuating pole 17 received in the telescopic handle 11, so that the actuating pole 17 is linked to the actuating lever 131. A compression spring 16 is connected between the pins 134 and 135. Thus, the actuating lever 131 and the actuating pole 17 are biased by means of the compression spring 16 away from the handle bar 12.

Two latch-receiving holes 21 and 22 are formed through the tube 111. Three latch-receiving holes 23, 24 and 25 are formed through the tube 112. A latch-receiving hole 26 is formed through the tube 113.

The eye 170 and four blocks 171, 172, 173 and 174 are sequentially formed on the actuating pole 17. The block 171 tapers upwards. The block 172 tapers upwards. The block 173 tapers upwards. The block 174 tapers downwards.

The telescopic handle 11 employs two locking devices 18 and 19 in order to lock the tubes 111, 112 and 113 in various relative positions between one another.

The locking device 18 has a flat-head screw 181, a compression spring 182 and a latch 183. The latch 183 is substantially a cylindrical member with a flat tip abutting against the compression spring 182 and a semi-spherical tip being insertable through the latch-receiving holes.

The locking device 19 has a flat-head screw 191, a compression spring 192 and a latch 193. The latch 193 is substantially a cylindrical member with a flat tip abutting against the compression spring 192 and a semi-spherical tip being insertable through the latch-receiving holes.

The locking devices 18 and 19 are not described in detail as they are identical to the elements indicated with identical numerals in U.S. Pat. No. 5,127,664.

As shown in FIG. 2, the telescopic handle 11 is locked in an extended position. That is, the tube 111 is locked in an extended position relative to the tube 112 which is locked in an extended position relative to the tube 113.

As the latch-receiving holes 22 and 23 align with each other, the latch 183 is biased by means of the compression spring 182 so that the cylindrical portion of the latch 183 is disposed in the latch-receiving holes 22 and 23. Thus, the tube 111 is locked in the extended position in the tube 112.

To retract the tube 111 into the tube 112, the actuating pole 17 is moved upwards by means of pulling the actuating lever 131 with a user's fingers. As the block 172 is moved upwards, it abuts against the semi-spherical tip of the latch 183 in order to push the same into the latch-receiving hole 22. Then, by pressing the handle bar 12, the tube 111 is subjected to a force which is apt to push the tube 111 into the tube 112. An annular rim which encloses the latch-receiving hole 22 abuts against the semi-spherical tip of the latch 183 so as to push the same out of the latch-receiving hole 22. As a result, the tube 111 is retractable into the tube 112. The actuating lever 131 is released immediately after the tube 111 is moved relative to the tube 112.

Figure 3:
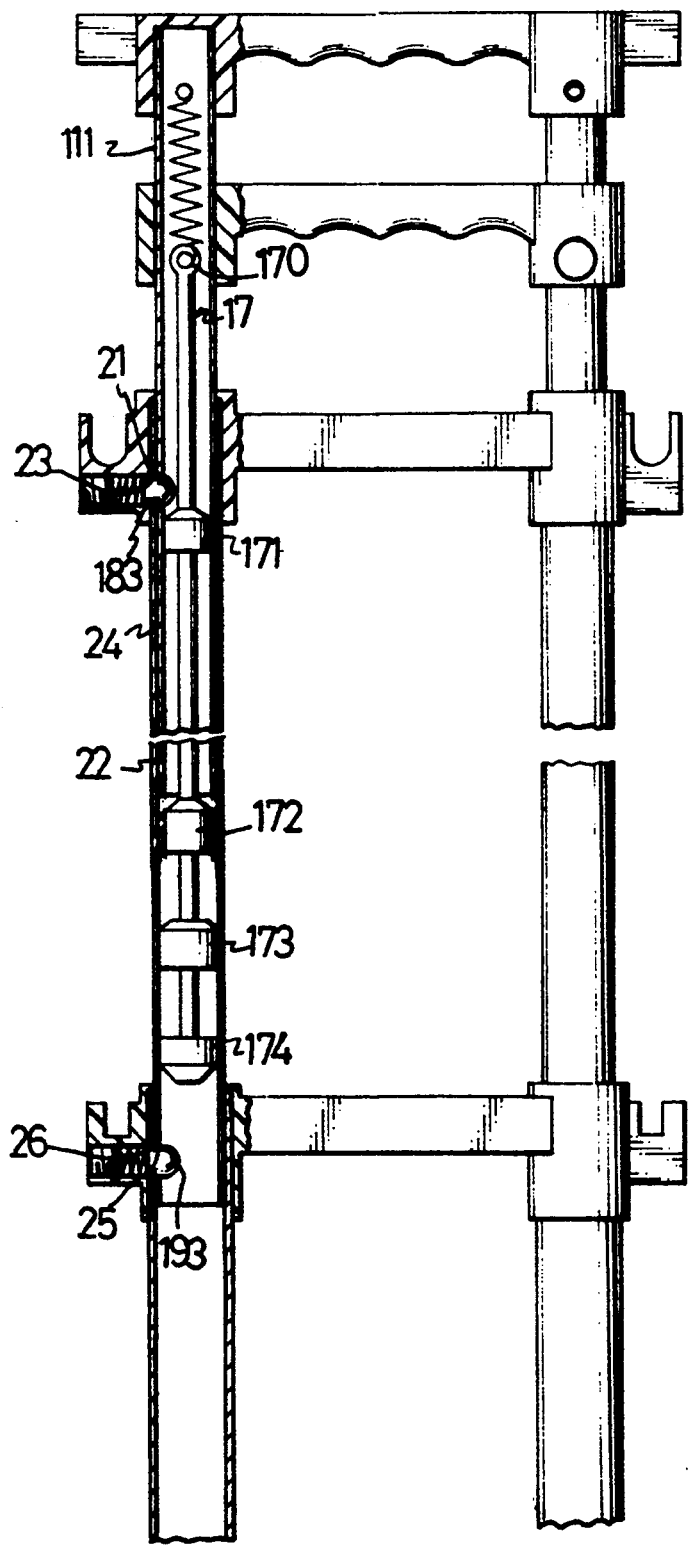
FIGS. 3-6 are views similar to FIG. 2 but showing the telescopic handles in different positions.

Referring to FIG. 3, as the latch 183 is biased by means of the compression spring 182, the cylindrical portion of the latch 183 is disposed in the latch-receiving holes 21 and 23 when the latch-receiving holes 21 and 23 align with each other. As a result, the tube 111 is locked in a retracted position in the tube 112.

The latch 193 is biased by means of the compression spring 192 into the latch-receiving holes 26 and 25 when the latch-receiving holes 26 and 25 align with each other. The cylindrical portion of the latch 193 is disposed in the latch-receiving holes 26 and 25. Thus, the tube 112 is retained in an extended position in the tube 113.

To further retract the tube 111 into the tube 112 and to retract the tube 112 into the tube 113, the actuating pole 17 is moved upwards by pulling the actuating lever 131 upwards with the user's fingers. As the block 171 is moved upwards, it abuts against the semi-spherical tip of the latch 183 so as to push the same into the latch-receiving hole 21. Then, by pressing the handle bar 12, the tube 111 is subjected to a force which is apt to push the tube 111 into the tube 112, an annular rim which encloses the latch-receiving hole 21 abuts against the semi-spherical tip of the latch 183 so as to push the same out of the latch-receiving hole 21. Thus, the tube 111 is further retracted into the tube 112. The actuating lever 131 is released after the tube 111 is moved relative to the tube 112.

As the tube 111 and the actuating pole 17 are pushed downwards, the block 174 abuts against the semi-spherical tip of the latch 193 so as to push the same into the latch-receiving hole 25. As a result, the tube 112 is pushed into the tube 113.

Figure 4:
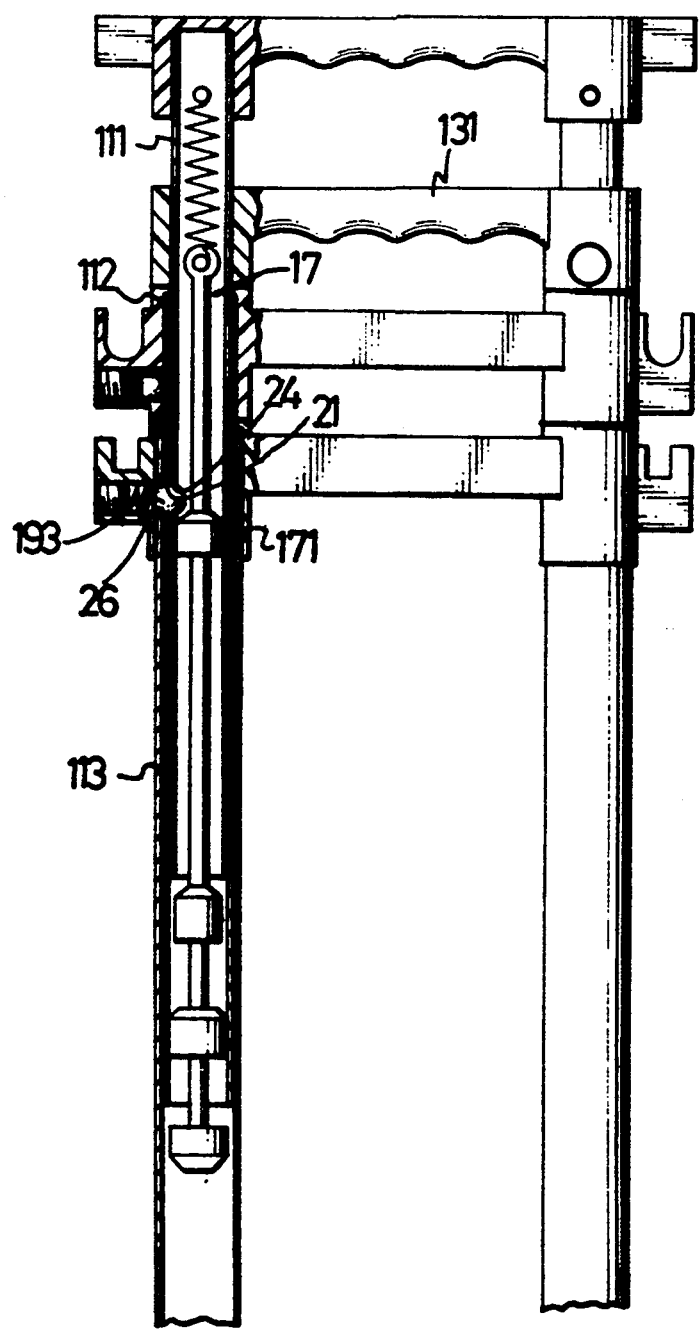

Referring to FIG. 4, the cylindrical portion of the latch 193 is inserted through the latch-receiving holes 26, 24 and 21 as the latch-receiving holes 26, 24 and 21 align with one another when the tube 111 is retracted in the tube 112 and the tube 112 is retracted in the tube 113. Thus, the telescopic handle 11 is locked in a retracted position.

The present invention provides a trolley employing two telescopic handles being lockable in a retracted position. Moreover, the telescopic handle 11 is lockable in other positions.

To pull the tube 111 out of the tube 112, the actuating pole 17 is moved upwards by pulling the actuating lever 131 upwards with the user's fingers. As the block 171 is moved upwards, it abuts against the semi-spherical tip of the latch 193 so as to push the same into the latch-receiving hole 21. Then, by pulling the handle bar 12, the tube 111 is subjected to a force being apt to pull the tube 111 out of the tube 112 so that an annular rim, which encloses the latch-receiving hole 21, abuts against the semi-spherical tip of the latch 183 so as to push the same out of the latch-receiving hole 21. Thus, the tube 111 is extendible out of the tube 112.

Figure 5:
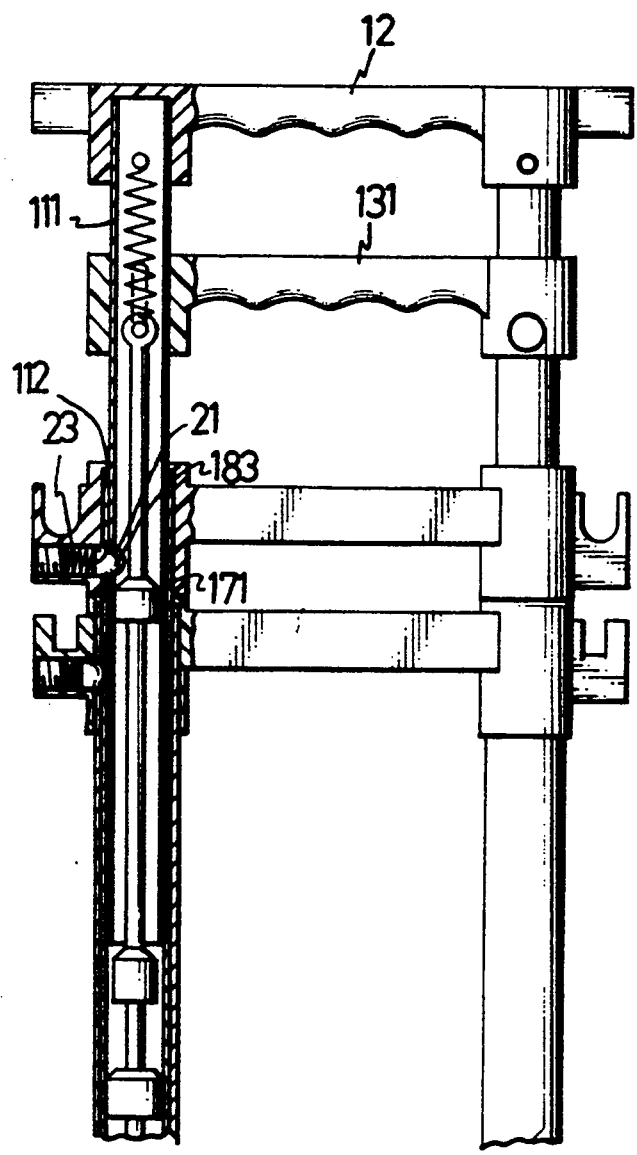

Referring to FIG. 5, the tube 111 is extendible from the tube 112 until the latch 183 is inserted through the hole 21 as the hole 23 aligns with the hole 21. By moving the actuating lever 131 upwards, the block 171 abuts against the semi-spherical tip of the latch 183 in order to push the same into the hole 21. By pulling the handle bar 12, the tube 111 is subjected to a force being apt to pull the tube 111 upwards. Thus, the annular rim, which encloses the hole 21, pushes the semi-spherical tip of the latch 183 into the hole 23 so that the tube 111 is extendible from the tube 112.

Figure 6:
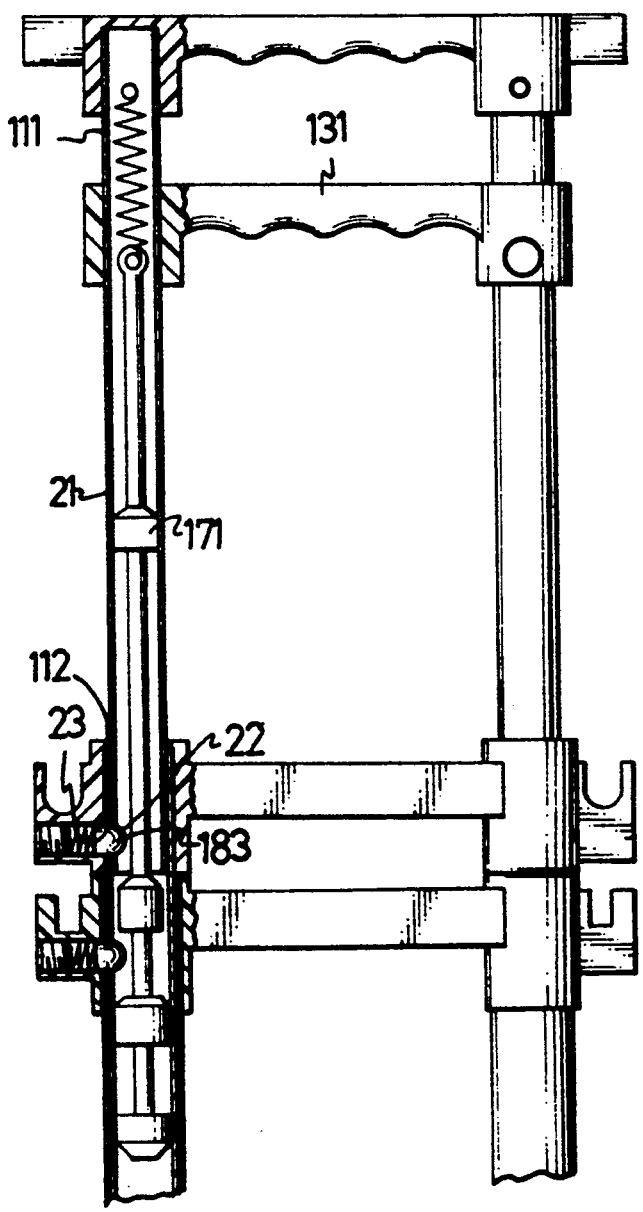

Referring to. FIG. 6, the actuating lever 131 is released after the tube 111 is moved relative to the tube 112. The tube 111 is pulled out of the tube 112 until the latch 183 is inserted into the latch-receiving hole 22 as the holes 22 and 23 align with each other.

Although the invention has been explained in relation to its preferred embodiment, it is to be understood that many other possible modifications and variations can be made without departing the spirit and scope of the invention as hereinafter claimed.

What is claimed is:

1. A trolley handle comprising:
a first tube being telescopically received in a second tube being telescopically received in a third tube, the first tube comprising a pin-receiving hole being formed therethrough, a slot being formed therethrough below the pin-receiving hole, a first hole being formed therethrough below the slot and a second hole being formed therethrough below the first hole, the second tube comprising a first hole being formed therethrough, a second hole being formed therethrough below the first hole being formed therethrough and a third hole formed therethrough below the second hole being formed therethrough, the third tube comprising a hole being formed therethrough;

an actuating pole being longitudinally disposed in the first tube and comprising an eye being formed at an upper end thereof, a first block being formed below the eye, a second block being formed below the first block and a third block being formed below the second block and a fourth block being formed on a lower end thereof;

a first pin being inserted through the pin-receiving hole formed through the first tube;

a second pin being inserted through the slot formed through the first tube;

a compression spring linking the first and second pins to each other so that the actuating pole is biased away from the first pin;

a first locking device being mounted on an upper end of the second tube and comprising a latch being biased by means of a compression spring being received therein into the first hole formed through the second tube, the latch comprising a semi-spherical tip; and a second locking device being mounted on an upper end of the third tube and comprising a latch being biased by means of a compression spring being received therein into the hole formed through the third tube, the latch comprising a semi-spherical tip;

the first block being disposed below the first hole formed through the first tube in order to retract the semi-spherical tip of the latch of one of the locking devices into the first hole formed through the first tube when the first block is moved upwards by moving the second pin upwards;

the second block being disposed below the second hole formed through the first tube in order to retract the semi-spherical tip of the latch of the first locking device into the first hole formed through the first tube when the first block is moved upwards by moving the second pin upwards;

the third block being disposed below the second hole formed through the second tube when the first tube is in an extended position in order to retract the semi-spherical tip of the latch of the second locking device into the second hole formed through the second tube when the third block is moved upwards by moving the second pin upwards;

the fourth block retracting the semi-spherical tip of the second locking device into the third hole formed through the second tube.

2. A trolley handle as claimed in claim 1 comprising an actuating lever attached to the second pin so that the actuating pole is moveable by moving the actuating lever.

3. A trolley handle as claimed in claim 2 wherein the actuating lever comprises a sleeve, which comprises a pin-receiving hole formed therethrough, being formed thereon, the first tube is inserted through the sleeve and the second pin is inserted through the pin-receiving hole formed through the sleeve of the actuating lever.

* * * * *